(12) United States Patent
Konoura et al.

(10) Patent No.: US 11,687,643 B2
(45) Date of Patent: Jun. 27, 2023

(54) INFORMATION LINKAGE SYSTEM AND INFORMATION LINKAGE METHOD

(71) Applicant: Hitachi, Ltd., Tokyo (JP)

(72) Inventors: Hiroaki Konoura, Tokyo (JP);
Masafumi Kinoshita, Tokyo (JP);
Hirofumi Inomata, Tokyo (JP);
Masaki Hirayama, Tokyo (JP);
Ryouichi Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 818 days.

(21) Appl. No.: 16/574,280

(22) Filed: Sep. 18, 2019

(65) Prior Publication Data
US 2020/0242233 A1 Jul. 30, 2020

(30) Foreign Application Priority Data

Jan. 30, 2019 (JP) .................................. 2019-014216

(51) Int. Cl.
*G06F 21/45* (2013.01)
*G06F 21/62* (2013.01)
(Continued)

(52) U.S. Cl.
CPC .......... *G06F 21/45* (2013.01); *G06F 21/6245* (2013.01); *G06Q 10/06315* (2013.01); *G06Q 10/10* (2013.01)

(58) Field of Classification Search
CPC ...... G06F 21/45; G06F 21/6245; G06F 21/31; G06F 2221/2101; G06F 2221/2149;
(Continued)

(56) References Cited

U.S. PATENT DOCUMENTS

| 8,443,429 B1 * | 5/2013 | Johnson, Sr. ........... H04L 67/02 726/8 |
| 11,120,158 B2 * | 9/2021 | Hockey .................. G06Q 40/12 |

(Continued)

FOREIGN PATENT DOCUMENTS

| JP | 2011-100361 A | 5/2011 |
| JP | 2018-173937 A | 11/2018 |

(Continued)

OTHER PUBLICATIONS

Extended European Search Report, dated Jan. 14, 2020, which issued during the prosecution of European Application No. 19197915.2, which corresponds to the present application.

(Continued)

*Primary Examiner* — Huan V Doan
(74) *Attorney, Agent, or Firm* — Baker Botts L.L.P.

(57) ABSTRACT

Provided is an information linkage system, comprising: a processor; and a storage device coupled to the processor, the storage device holds identification information of a user and information on the user, which are added by a first organization, in association with each other, the processor: transmits to a second organization an information linkage application regarding information on any one item included in the information on the user; acquires, when the information linkage application is received, identification information of the user and information on the user of the item specified by the information linkage application, which are added by the second organization; and stores the acquired information in the storage device in association with the identification information of the user and the information on the user regarding the same user as a user identified by the acquired identification information, which are added by the first organization.

8 Claims, 13 Drawing Sheets

DATA UPDATE PROCESSING SEQUENCE AFTER INFORMATION LINKAGE

(51) Int. Cl.
*G06Q 10/10* (2023.01)
*G06Q 10/0631* (2023.01)

(58) Field of Classification Search
CPC ........ G06F 21/6218; G06F 2221/2141; G06Q 10/10; G06Q 10/06315; H04W 12/02
See application file for complete search history.

(56) References Cited

U.S. PATENT DOCUMENTS

| | | | | |
|---|---|---|---|---|
| 11,163,432 | B2* | 11/2021 | Toyota | G06F 9/3004 |
| 11,288,359 | B1* | 3/2022 | Caldwell | H04L 63/083 |
| 2012/0192253 | A1 | 7/2012 | Betsch et al. | |
| 2016/0364763 | A1* | 12/2016 | Nomula | G06Q 30/0277 |
| 2018/0218074 | A1 | 8/2018 | Ishikawa et al. | |
| 2019/0253430 | A1* | 8/2019 | Gamache | G06F 21/6218 |
| 2019/0253431 | A1 | 8/2019 | Atanda | |
| 2020/0310609 | A1* | 10/2020 | Ham | G06F 3/0488 |
| 2021/0352073 | A1* | 11/2021 | O'Connell | G06Q 20/4016 |

FOREIGN PATENT DOCUMENTS

| | | | |
|---|---|---|---|
| WO | WO 2003/105002 A1 | 12/2003 | |
| WO | WO 2016/063 092 A1 | 4/2016 | |

OTHER PUBLICATIONS

Notice of Reasons for Refusal, dated Feb. 22, 2022, for Japanese Application No. 2019-014216 (with English translation).

\* cited by examiner

DB TABLE EXAMPLE OF ORGANIZATION X RELATING TO USER U

DB TABLE EXAMPLE OF ORGANIZATION Y RELATING TO USER U

DB TABLE EXAMPLE OF ORGANIZATION Z RELATING TO USER U

| KEY FIELD | | | DATA FIELD | | | | | | |
|---|---|---|---|---|---|---|---|---|---|
| | | | X-DATA | | Y-DATA | | Z-DATA | | |
| X-ID | X-KEY | Y-KEY | Z-ID | NAME | AGE | ... | ADDRESS | ... | LAST NAME | FIRST NAME | Z SERVICE USAGE COUNT | ... |
| 0001 | *** | y@y.com | *** | 1801 | TARO UEDA | 20 | ... | @yyy | ... | UEDA | TARO | 2 | ... |

~701

702 — LIST OF COMBINATIONS OF ID INFORMATION AND KEY INFORMATION VALID FOR DATA FIELD ACCESS
1. X-ID & Y-KEY
2. Z-ID & X-KEY

EXAMPLE OF INFORMATION LINKAGE DB TABLE RELATING TO USER U
(WHEN ALL PERSONAL INFORMATION HAS BEEN LINKED)

*FIG. 7*

| INFORMATION LINKAGE DB TABLE COLUMN | X-ID | X-KEY | Y-ID | Y-KEY | Z-ID | X-DATA | Y-DATA | Z-DATA |
|---|---|---|---|---|---|---|---|---|
| TARGET COLUMN ACCESS AUTHORITY OF ORGANIZATION X | R/W | R/W | R | R | R | R/W | R | R |
| TARGET COLUMN ACCESS AUTHORITY OF ORGANIZATION Y | R | R | R/W | R/W | R | R | R/W | R |
| TARGET COLUMN ACCESS AUTHORITY OF ORGANIZATION Z | R | R | R | R | R/W | R | R | R/W |

R: CAN REFERENCE
R/W: CAN REFERENCE AND UPDATE

KEY FIELD (X-ID, X-KEY, Y-ID, Y-KEY, Z-ID) | DATA FIELD (X-DATA, Y-DATA, Z-DATA)

BASIC ACCESS AUTHORITY GRANTING EXAMPLE
IN INFORMATION LINKAGE DB TABLE

*FIG. 8A*

| INFORMATION LINKAGE DB TABLE COLUMN | X-ID | X-KEY | Y-ID | Y-KEY | Z-ID | X-DATA | Y-DATA | Z-DATA |
|---|---|---|---|---|---|---|---|---|
| TARGET COLUMN ACCESS AUTHORITY OF ORGANIZATION X | R/W | R/W | R | R | R | R/W | R | R |
| TARGET COLUMN ACCESS AUTHORITY OF ORGANIZATION Y | R | R | R/W | R/W | - | R | R/W | - |
| TARGET COLUMN ACCESS AUTHORITY OF ORGANIZATION Z | R | R | - | - | R/W | R | - | R/W |

EXAMPLE IN WHICH EACH ORGANIZATION FREELY SETS
ACCESS AUTHORITY IN INFORMATION LINKAGE DB TABLE
(DATA IS SHARED BETWEEN ORGANIZATIONS X AND Y AND BETWEEN
ORGANIZATIONS X AND Z, BUT IS NOT SHARED BETWEEN ORGANIZATIONS Y AND Z)

EXAMPLE OF IDEA OF ACCESS AUTHORITY
IN INFORMATION LINKAGE DB TABLE

*FIG. 8B*

INFORMATION LINKAGE SYSTEM AND INFORMATION LINKAGE METHOD

CLAIM OF PRIORITY

The present application claims priority from Japanese patent application JP2019-014216 filed on Jan. 30, 2019, the content of which is hereby incorporated by reference into this application.

BACKGROUND

This invention relates to an information linkage system and an information linkage method, for linking information among organizations.

The trend toward using the vast amount of IoT data in the world to reduce costs and create new businesses is attracting widespread attention. Until now, organizations have tried to turn their own organization data or open data into value by using IT and IoT systems.

Moreover, in "Society 5.0", which is a concept of future society originated in Japan, there is advocated the concept of a "data linkage platform" for creating value by linking information held in various fields such as autonomous driving, infrastructure, agriculture, medical care, and finance. In response to this, there are widening efforts to create new businesses based on linkage of information across organizations in various fields.

In linkage of information across organizations, personal authentication and linkage of personal information are issues.

Regarding the above-mentioned issues, in WO 2003/105002 A1, there is disclosed a system in which a person is authenticated and associated with personal information in a general-purpose manner.

In WO 2003/105002 A1, it is described that "Provided is a general-purpose system capable of authenticating people in an organization. The system is constructed of an on-line data processing system, for example, a WEB server, to be accessed from a user terminal, and an authentication body system coupled thereto via a network. The on-line data processing system includes electronic certificate receiving means for receiving an electronic certificate transmitted from the user terminal, and authentication means for authenticating the user by transmitting and receiving data to and from the authentication body system. The authentication body system includes an authentication database configured to store industry type identification data, such as a company code, and personal authentication data for authenticating a person in an organization by associating the industry and the person to each other. User authentication is performed based on authentication information that is extracted from the authentication database and that includes at least information on an authority of the person in the organization".

SUMMARY

There is assumed a case in which a service based on linkage of information among organizations is provided to users. An example of a service based on linkage of information is digitization of property viewing in the real estate industry. In property viewing in the real estate industry, the usual flow is that a customer user visits a real estate shop, fills out his or her personal information, and views a property together with a staff member from the shop. For such property viewing in the real estate industry, by linking and digitizing the personal information and authentication information from a third-party body, the user can reserve a viewing through personal authentication via an application and view the property directly without visiting the real estate shop. As a result, it is possible to reduce the time and effort required for the user to view the property, and more property viewings and even concluded purchase contracts can be expected.

In addition, by linking information on property viewings and concluded purchase contracts of users among third-party bodies or other organizations in addition to the third-party bodies, various secondary services such as moving arrangement services and insurance subscription proposal services can be expected to be provided to users having latent needs.

In order to implement an example of a viewing, highly accurate authentication of a person to be authenticated that prevents impersonation of the person on digital data is required. In addition, there is required a mechanism for obtaining the consent of a user who executed the application to link the user with the personal information and authentication information from the third party. Further, it is required that the organizations that have linked the information gain value in creating new businesses by, in place of providing information in one direction from the third-party body side, newly adding and sharing in both directions property viewing history information and the like on the real estate agent as personal information.

In particular, implementation of such adding and linking of information in both directions is important in order to build an ecosystem that increases the amount and quality of the personal information held by the information linkage platform, increases the number of organizations participating in the information linkage platform aimed at using such personal information, and as a result, further increases the amount and quality of the personal information. When information is to be mutually linked among three or more organizations, it is also important to define a range of personal information that is accessible for each organization to operate the personal information while facilitating the linking of the personal information and authentication information. In this way, there is a need for the establishment of an inter-organizational information linkage platform system enabling highly accurate personal authentication, the linking of users and personal information, and linkage of information in both directions to be implemented among a plurality of organizations.

However, this problem is not solved when only WO 2003/105002 A1 is applied, for the following reasons.

In WO 2003/105002 A1, there is disclosed means for authenticating people in an organization. However, there is no mention of linking personal information across a plurality of organizations, and there is no mention of means for linking personal information.

In addition, in the known technologies including WO 2003/105002 A1, there is no mention of a method involving authenticating a user to be authenticated and handling personal information in cooperation with one another across a plurality of organizations. Thus, an inter-organization information linkage system cannot be achieved.

Therefore, there is a need for the establishment of a mechanism for authenticating a user and linking the user with personal information while obtaining permission of information linkage from the user among a plurality of organizations to promote linkage of information in both directions.

In order to solve at least one of the foregoing problems, one embodiment of this invention is an information linkage system, comprising: a processor; and a storage device coupled to the processor, the storage device being configured to hold identification information of a user and information on the user, which are added by a first organization, in association with each other, the processor being configured to: transmit to a second organization an information linkage application regarding information on any one item included in the information on the user; acquire, when the information linkage application is received, identification information of the user and information on the user of the item specified by the information linkage application, which are added by the second organization; and store the acquired information in the storage device in association with the identification information of the user and the information on the user regarding the same user as a user identified by the acquired identification information, which are added by the first organization.

According to the teaching herein, linkage of information can be implemented among organizations linking and handling personal information across a plurality of organizations.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is an explanatory diagram for showing an example of an information linkage DB table stored in an information linkage DB in the embodiment.

FIG. 8A and FIG. 8B are each an explanatory diagram for showing an example of access authority of the information linkage DB table in the embodiment.

DETAILED DESCRIPTION OF THE EMBODIMENTS

An embodiment of this invention is now described with reference to the drawings.

The term "personal information" as used in the embodiment of this invention is defined as information on a living person in accordance with the revised Act on the Protection of Personal Information, and includes information that can be used to identify a specific person by name, date of birth, or other descriptions contained in the information, and a personal identification code (hereinafter referred to as "ID information"). In addition, in the personal information, key information to be used for authentication of a person to be authenticated in combination with ID information is defined as "authentication information".

Figure 1:
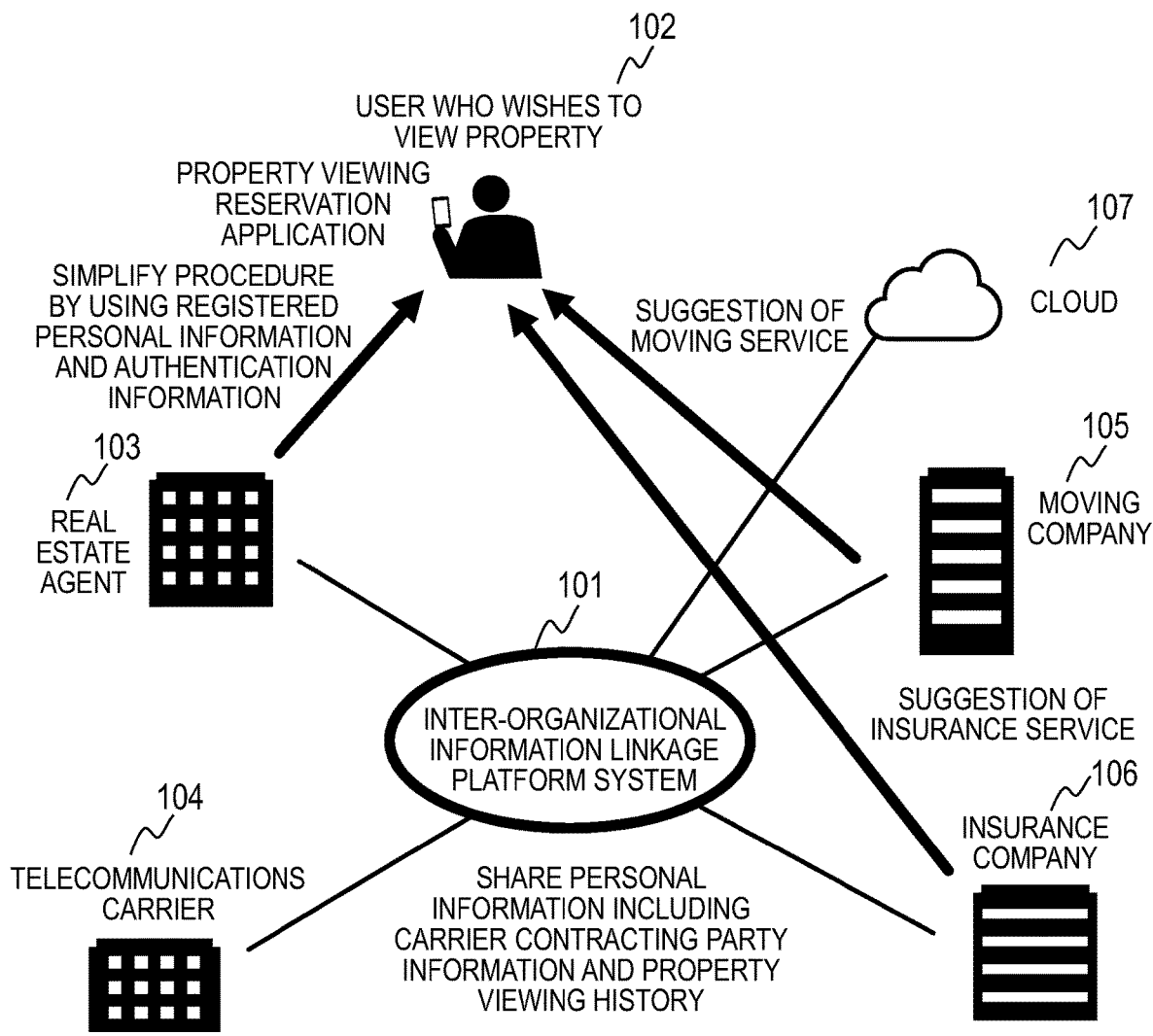
FIG. 1 is a diagram for illustrating a concept of an inter-organizational information linkage platform in an embodiment of this invention, in which a property viewing is used as an example.

FIG. 1 is a diagram for illustrating a concept of an inter-organizational information linkage platform in the embodiment of this invention, in which a property viewing is used as an example.

A real estate agent 103, a telecommunications carrier 104, a moving company 105, an insurance company 106, and other organizations having personal information on a cloud 107 link the personal information on a user via an inter-organizational information linkage platform system 101.

There is assumed a case in which a user 102 who has concluded a contract with the telecommunications carrier 104 and who wishes to view a property executes a property viewing reservation application provided by the real estate agent 103. The real estate agent 103 can simplify the conventional procedure, in which the user 102 who wishes to view the property visits the real estate shop and fills out a document with his or her personal information, by using personal information such as contracting party information and authentication information from the telecommunications carrier 104 to digitize the mechanism for identifying a person to be authenticated. Various services, such as a moving service and an insurance service, can be proposed at an appropriate timing in accordance with the needs of the user by linking information such as property viewing information and subsequent contract information with the moving company 105 and the insurance company 106. The real estate agent 103 can update the personal information to the newest possible state and increase the amount of personal information by linking the personal information with information from other organizations, and can thus lead to the creation of a new business.

In this way, through promoting information linkage among organizations and increasing the amount of personal information handled by the organizations, each organization linking the information can benefit from the creation of new businesses. The aim of this invention is to support and achieve situations in which such a virtuous cycle of information linkage promotion and business creation is born by using the inter-organizational information linkage platform system 101.

Figure 2:
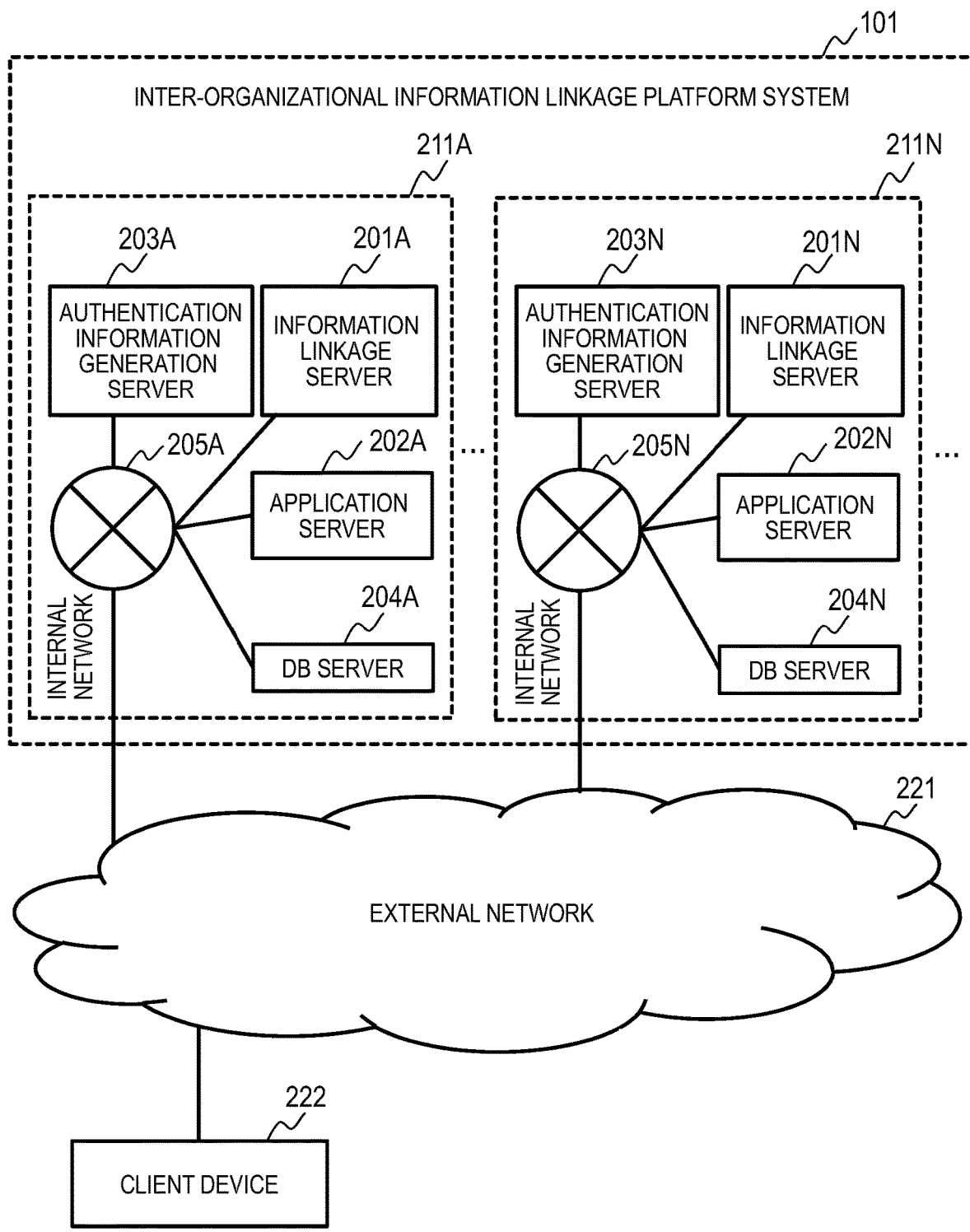
FIG. 2 is a block diagram for illustrating an example of a system configuration of an inter-organizational information linkage platform system in the embodiment.

FIG. 2 is a block diagram for illustrating an example of a system configuration of the inter-organizational information linkage platform system 101 in the embodiment.

As illustrated in FIG. 2, the inter-organizational information linkage platform system 101 includes a plurality of business operator systems 211 coupled to an external network 221. Each business operator system 211 includes an information linkage server 201, an application server 202, an authentication information generation server 203, and a database (DB) server 204, which are coupled to each other via an internal network 205.

In FIG. 2, business operator systems 211A and 211N are illustrated as examples of the plurality of business operator systems 211, but the inter-organizational information linkage platform system 101 may actually include more business operator systems. Each of the business operator systems 211A and 211N is a system to be used by, for example, the various business operators (i.e., organizations) such as the real estate agent 103, the telecommunications carrier 104, the moving company 105, and the insurance company 106 illustrated in FIG. 1. The business operator systems 211A and 211N may each be implemented by hardware independent from each other, or may be implemented on the cloud 107. In the following description, when the description is common to both the business operator systems 211A and 211N, those systems are collectively referred to as "business operator system 211". The reference symbols of each server and network in the business operator system 211 are handled in the same manner.

The information linkage server 201 is configured to execute, via the external network 221, processing and communication such as agreement of the information linkage target data with the information linkage server 201 of another organization (i.e., the information linkage server 201 included in a business operator system 211 different from the business operator system 211 including that information linkage server 201), an information linkage permission inquiry to a client device 222 of the user, and an information linkage start notification to and from the information linkage server of the another organization. The information linkage server 201 is also configured to receive, via the internal network 205, an information linkage request from the application server 202, to request the authentication information generation server 203 to generate authentication information, and to issue an inquiry to the DB server 204 of the own organization (i.e., the DB server 204 included in the business operator system 211 including that information linkage server 201).

The application server 202 is configured to receive and execute processing on an arbitrary application execution request via the client device 222 of the user or a device in the organization. In the embodiment, it is assumed that the above-mentioned arbitrary application issues an inquiry about personal information to the information linkage server 201.

The authentication information generation server 203 is configured to generate, in response to a request from the information linkage server 201, authentication information to be used for authentication of a person to be authenticated, and to pass on the generated authentication information to the information linkage server 201. The authentication information may be any information such as a password, a public key, or a public key corresponding to biometric authentication (e.g., face image identification, fingerprint authentication, and vein authentication). Information having a required authentication strength is selected to be used as the authentication information.

The DB server 204 is configured to store data originally held by the own organization. The DB server 204 is referred to when the user data is first entered into the information linkage DB.

The external network 221 is a communication equipment network for communication among organizations and communication to and from the client device 222 of the user. The internal network 205 is a communication equipment network for communicating within an organization. The communication equipment network of the external network 221 and the communication equipment network of the internal network 205 are, for example, the Internet, an intranet, or a wired or wireless local area network (LAN) or wide area network (WAN).

The information linkage server 201, the application server 202, the authentication information generation server 203, and the DB server 204 may each be a server apparatus constructed from a physical computer, or may be constructed from a virtual machine. Each of those servers may be constructed from a plurality of servers for distributed execution.

The role of each server apparatus may be mixed, and a part or all of the servers may be included in one apparatus. For example, the information linkage server 201 and the application server 202 may be constructed on a single physical server or virtual server.

Figure 3:
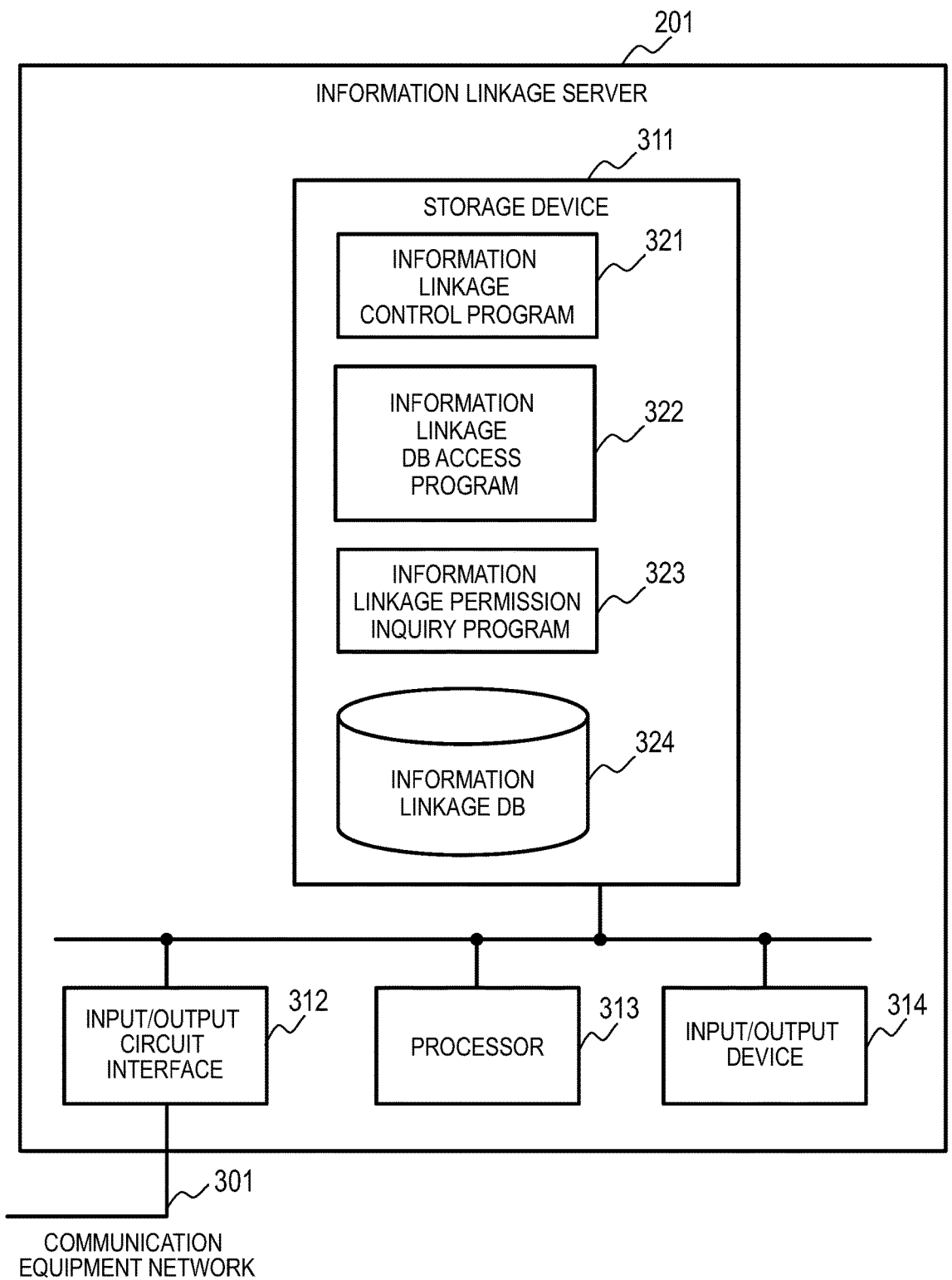
FIG. 3 is a block diagram for illustrating an example of hardware and functions to be included in an information linkage server in the embodiment.

FIG. 3 is a block diagram for illustrating an example of hardware and functions to be included in the information linkage server 201 in the embodiment.

The information linkage server 201 includes an input/output circuit interface 312, a processor 313, an input/output device 314, a storage device 311, and an internal communication line (e.g., bus) configured to couple those components to each other.

The input/output circuit interface 312 is an interface for communicating to and from a communication equipment network 301. The communication equipment network 301 is used to construct the internal network 205, for example.

The processor 313 is a calculation device and a control device. The information linkage function of the information linkage server 201 is implemented by the processor 313 executing an information linkage control program 321, an information linkage DB access program 322, and an information linkage permission inquiry program 323, which are each stored in the storage device 311. In other words, the processing described below to be implemented by the information linkage control program 321, the information linkage DB access program 322, and the information linkage permission inquiry program 323 in the following description is actually executed by the processor 313 based on those programs.

The input/output device 314 is a device for receiving data inputs, outputting data, or receiving data inputs and outputting data. For example, the input/output device 314 receives an input from a keyboard or a mouse, and displays information from the processor 313 on a display.

The storage device 311 includes a volatile storage device (e.g., dynamic access random memory (DRAM)) and a nonvolatile storage device (e.g., hard disk drive (HDD) and solid state drive (SSD)).

The storage device 311 is configured to store the information linkage control program 321, the information linkage DB access program 322, the information linkage permission inquiry program 323, and the information linkage DB 324.

The information linkage control program 321 is configured to start information linkage based on, for example, a call from the information linkage control program 321 of another organization via the external network 221, a call from an arbitrary service application, or a call from a command via the input/output device 314. Specifically, the information linkage control program 321 implements processing of notifying data to be linked among organizations, processing of permitting information linkage in response to such notification, or processing of, when there is an information linkage request from the user via an application, issuing a request to the information linkage DB inquiry program 323 and the information linkage DB access program 322 to perform the processing, and adding data to the information linkage DB, referring to the data of the information linkage DB, and returning a result of update of the information linkage DB.

The information linkage DB access program 322 is configured to access the information linkage DB 324, and to execute processing such as addition of a data item to be linked, writing the data to be linked, referring to the data to be linked, and updating the data to be linked.

The information linkage permission inquiry program 323 is called when it is required to receive, from the user, permission to link the information to be linked via the information linkage control program 321. The information linkage permission inquiry program 323 is configured to, as an application, display, on the client device 222 of the user, the data item to be linked and request an answer regarding whether or not the information may be linked.

The information linkage DB 324 is used for storing personal information to be shared among organizations. The data stored in the information linkage DB 324 is required to be the same regardless of which organization acquires the data. For this reason, the information linkage DB 324 is implemented by a centralized management type database that is held by only one organization to be accessed from other organizations, or a distributed management type database stored as a distributed ledger node among the organizations.

Figure 4:
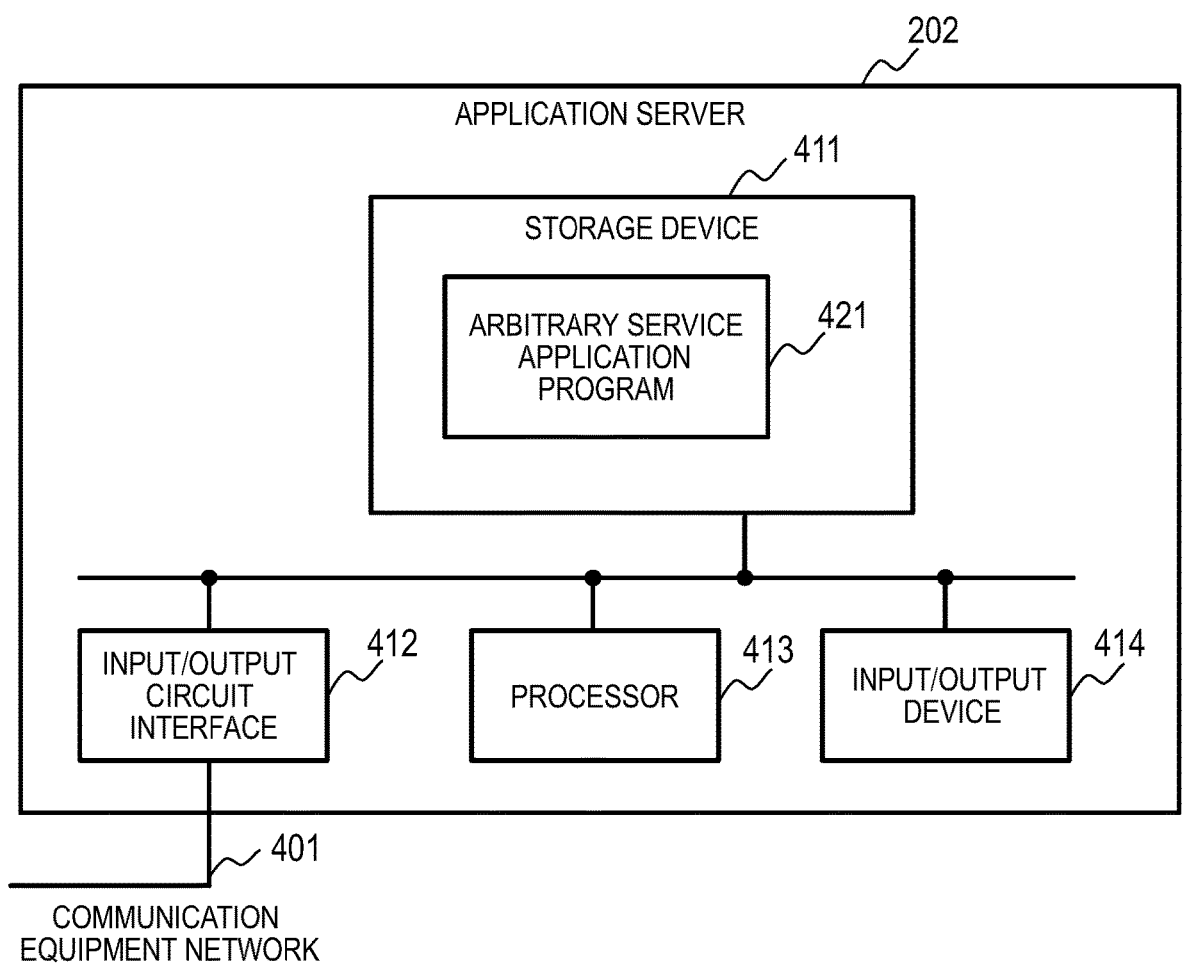
FIG. 4 is a block diagram for illustrating an example of hardware and functions to be included in an application server in the embodiment.

FIG. 4 is a block diagram for illustrating an example of hardware and functions to be included in the application server 202 in the embodiment.

The application server 202 includes an input/output circuit interface 412, a processor 413, an input/output device 414, a storage device 411, and an internal communication line (e.g., bus) configured to couple those components to each other.

The input/output circuit interface 412 is an interface for communicating to and from a communication equipment network 401. The communication equipment network 401 is used to construct the internal network 205, for example.

The processor 413 is a calculation device and a control device. An arbitrary service of the application server 202 is implemented when the processor 413 executes an arbitrary service application program 421 stored in the storage device. In other words, the processing to be implemented by the arbitrary service application program 421 in the following description is actually executed by the processor 413 based on the arbitrary service application program 421.

The input/output device 414 is a device for receiving data inputs, outputting data, or receiving data inputs and outputting data. For example, the input/output device 414 receives an input from a keyboard or a mouse, and displays information from the processor 413 on a display.

The storage device 411 includes a volatile storage device (e.g., DRAM) and a nonvolatile storage device (e.g., HDD and SSD).

The storage device 411 is configured to store the arbitrary service application program 421.

In the embodiment, the arbitrary service application program 421 is a program for accessing the linked data to implement arbitrary processing while identifying a person and referring to and updating the required information. In the example of property viewing described with reference to FIG. 1, the property viewing reservation application corresponds to the arbitrary service application 421.

Figure 5:
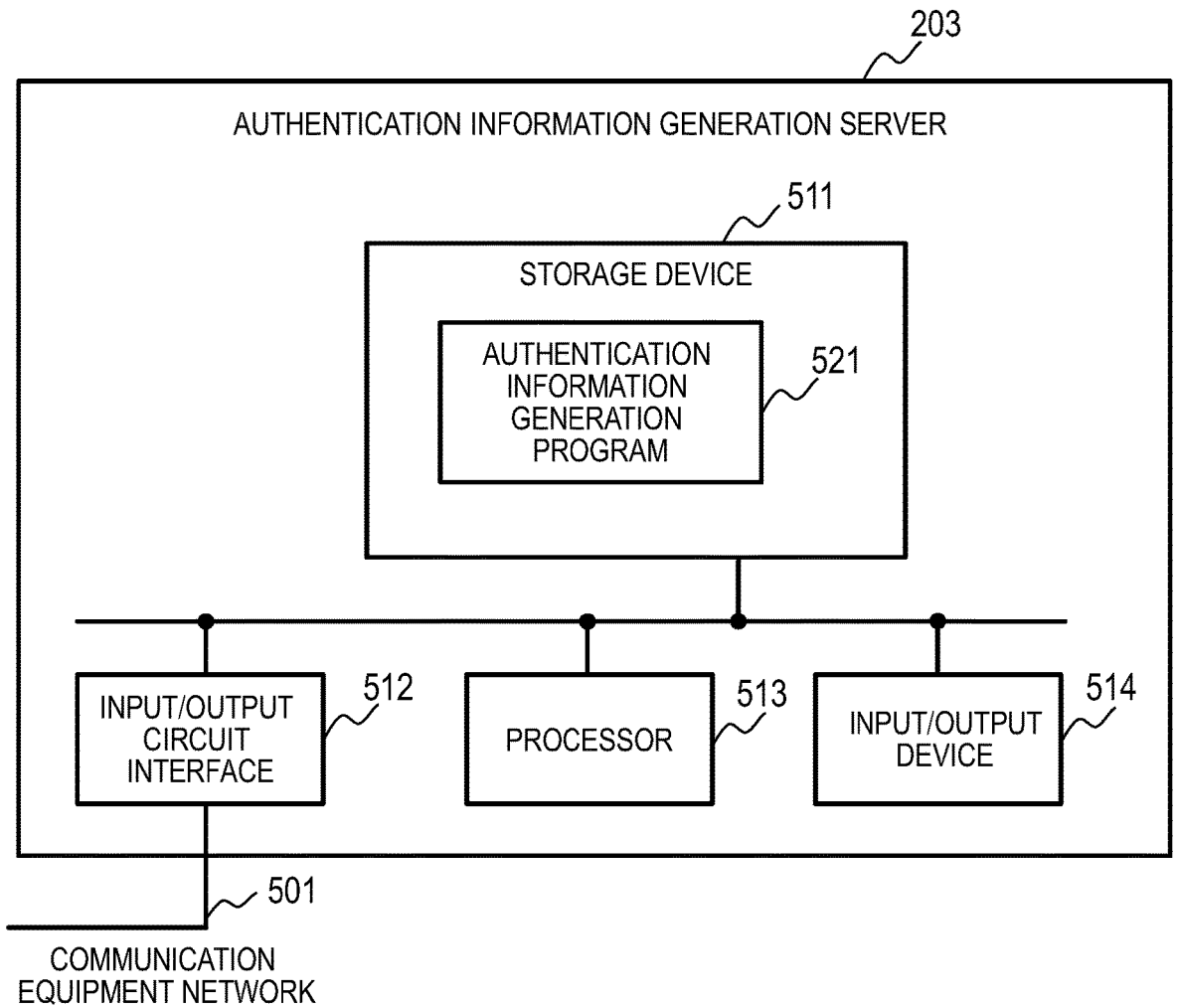
FIG. 5 is a block diagram for illustrating an example of hardware and functions to be included in an authentication information generation server in the embodiment.

FIG. 5 is a block diagram for illustrating an example of hardware and functions to be included in the authentication information generation server 203 in the embodiment.

The authentication information generation server 203 includes an input/output circuit interface 512, a processor 513, an input/output device 514, a storage device 511, and an internal communication line (e.g., bus) configured to couple those components to each other.

The input/output circuit interface 512 is an interface for communicating to and from a communication equipment network 501. The communication equipment network 501 is used to construct the internal network 205, for example.

The processor 513 is a calculation device and a control device. Generation of authentication information is implemented when the processor 513 executes an authentication information generation program 521 stored in the storage device 511. In other words, the processing to be implemented by the authentication information generation program 521 in the following description is actually executed by the processor 513 based on the authentication information generation program 521.

The input/output device 514 is a device for receiving data inputs, outputting data, or receiving data inputs and outputting data. For example, the input/output device 514 receives an input from a keyboard or a mouse, and displays information from the processor 513 on a display.

The storage device 511 includes a volatile storage device (e.g., DRAM) and a nonvolatile storage device (e.g., HDD and SSD).

The storage device 511 is configured to store the authentication information generation program 521.

The authentication information generation program 521 is configured to generate authentication information. The authentication information may be any information such as a password, a public key, or a public key corresponding to biometric authentication (e.g., face image identification, fingerprint authentication, and vein authentication). Information having a required authentication strength is selected to be used as the authentication information. For example, in the case of biometric authentication, the authentication information generation program 521 generates a public key for which the biometric authentication serves as a secret key. In such a case, the authentication information generation program 521 requests the user to input information as required, and generates the public key based on the input.

Figure 6A:
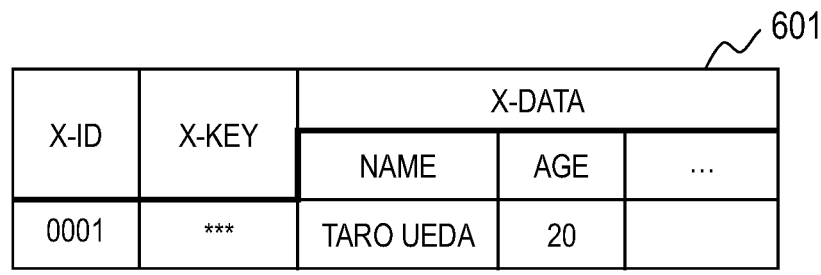
FIG. 6A to FIG. 6C are each an explanatory diagram for showing an example of a DB table stored in the DB of each organization in the embodiment.
Figure 6B:
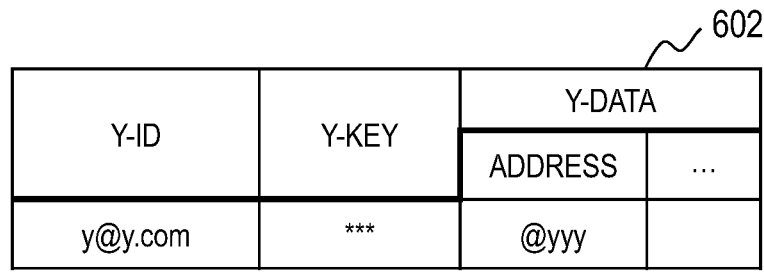
Figure 6C:
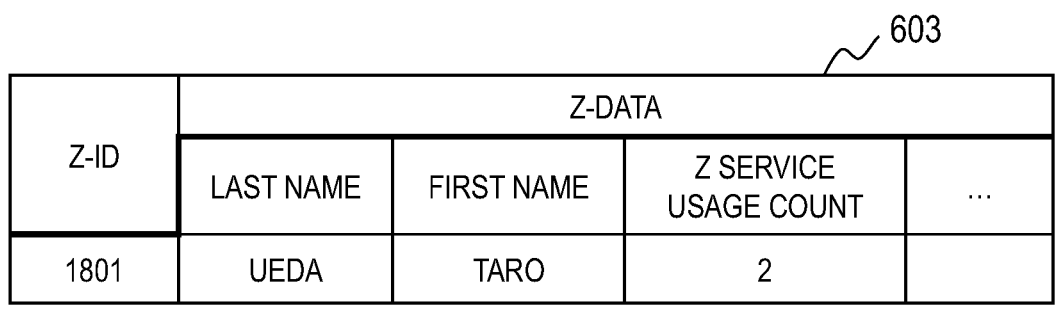

FIG. 6A to FIG. 6C are each an explanatory diagram for showing an example of a DB table stored in the DB of each organization in the embodiment. FIG. 7 is an explanatory diagram for showing an example of the information linkage DB table stored in the information linkage DB 324 in the embodiment. This information linkage DB table is obtained by linking the DB table of each organization of FIG. 6A to FIG. 6C. FIG. 6A to FIG. 6C and FIG. 7 are based on the presumption that the user U of each table is the same person.

A data table 601 of an organization X shown in FIG. 6A includes ID information and public key information, and includes information on a first name, a last name, and an age as data items.

A data table 602 of an organization Y shown in FIG. 6B includes ID information and public key information, and includes information on an address as a data item.

A data table 603 of an organization Z shown in FIG. 6C includes ID information, and includes information on a first name, a last name, and a Z service usage count as data items.

An information linkage DB table 701 shown in FIG. 7 is obtained by linking all of the personal information on the user U from the organizations X, Y, and Z. As key fields, ID information and public key information on the organization X, ID information and public key information on the organization Y, and ID information on the organization Z are stored. As data fields, the first name, the last name, and the age stored by the organization X, the address stored by the organization Y, and the last name, the first name, and the Z service usage count stored by the organization Z are stored.

In order to inquire about a data record in the information linkage DB table 701, any one of the key fields is selected and then the secret key paired with the public key of the selected key field is presented. When the organization X is selected, the record is identified based on the ID information on the organization X, then the secret key paired with the public key of the organization X is presented, and access to the data field is permitted only when decryption is successful.

It is not required that the ID information and the public key information relate to one organization. For example, permission to access a data field may be issued by presenting the secret information corresponding to the ID information on the organization Z and the public key information on the organization Y. Permission to access a data field may also be issued based on any combination of all the registered ID information and the secret keys corresponding to all the public key information. A list 702 of the combinations of the ID information and the key information valid for data field access may be provided in advance, and permission to access a data field may be issued in accordance with the list 702.

The example of the combination list 702 of FIG. 7 is also valid for a combination of the ID of a user in the organization X and the secret key assigned to the user in the organization Y, and the ID of the user in the organization Z and the secret key assigned to the user in the organization X (i.e., access to the applicable data field is permitted even when such a combination is input).

FIG. 8A and FIG. 8B are each an explanatory diagram for showing an example of access authority of the information linkage DB table in the embodiment.

As a basic example of granting access authority, there is described an example in which all data of the information linkage DB table can be referred to from all organizations, and update authority is obtained for the data of data items added by the own organization (illustrated as access authority granting example 801 of FIG. 8A). For example, the organization X has reference and update authority for the ID information, the public key information, and the data fields added by the organization X, and has reference authority for the other data items.

Meanwhile, for example, when the data of a key field is changed, other organizations that have been accessing the data by using that data are no longer able to access the data. Therefore, when data is to be updated, a notification about the update is issued in advance among organizations.

When information is linked by three or more organizations, it is desired in some cases that arbitrary data be able to be referred to from a given organization but not from the other organizations. Examples of a method of determining whether or not the data can be referred to by each organization include, in the access authority granting example 801, a method of granting a right to control reference authority to the organization that has added the data item, and enabling the authority for each organization to be freely set as in the access authority granting example 802 of FIG. 8B, and a method of encrypting the data itself and sharing a decryption key with organizations that desire to refer to the data.

The authority of an organization to access the data stored in the data field of the information linkage DB table may be individually set for each data item. For example, the authority of the organization Z may be set such that, of the data of the organization Y, the organization Z can refer to only the "address" data item.

Information on the granting of access authority such as that shown in FIG. 8A or FIG. 8B is stored in the storage device 311 of the information linkage server 201, for example.

In the access authority granting example 802 of FIG. 8B, the organization X has reference and update authority for the ID information, the public key information, and the data fields added by the organization X, and reference authority for the other data items.

Meanwhile, the organization Y has reference and update authority for the ID information, the public key information, and the data fields added by the organization Y, and has reference authority for the data items added by the organization X and the data items added by the organization Y, but does not have reference authority for the data items added by the organization Z. Similarly, the organization Z has reference and update authority for the ID information and the data fields added by the organization Z, and has reference authority for the data items added by the organization Z and the data items added by the organization X, but does not have reference authority for the data items added by the organization Y.

The example described above corresponds to a case in which, for example, there is an information linkage agreement between the organization X and the organization Y and between the organization X and the organization Z, but there is not an information linkage agreement between the organization Y and the organization Z.

Figure 9:
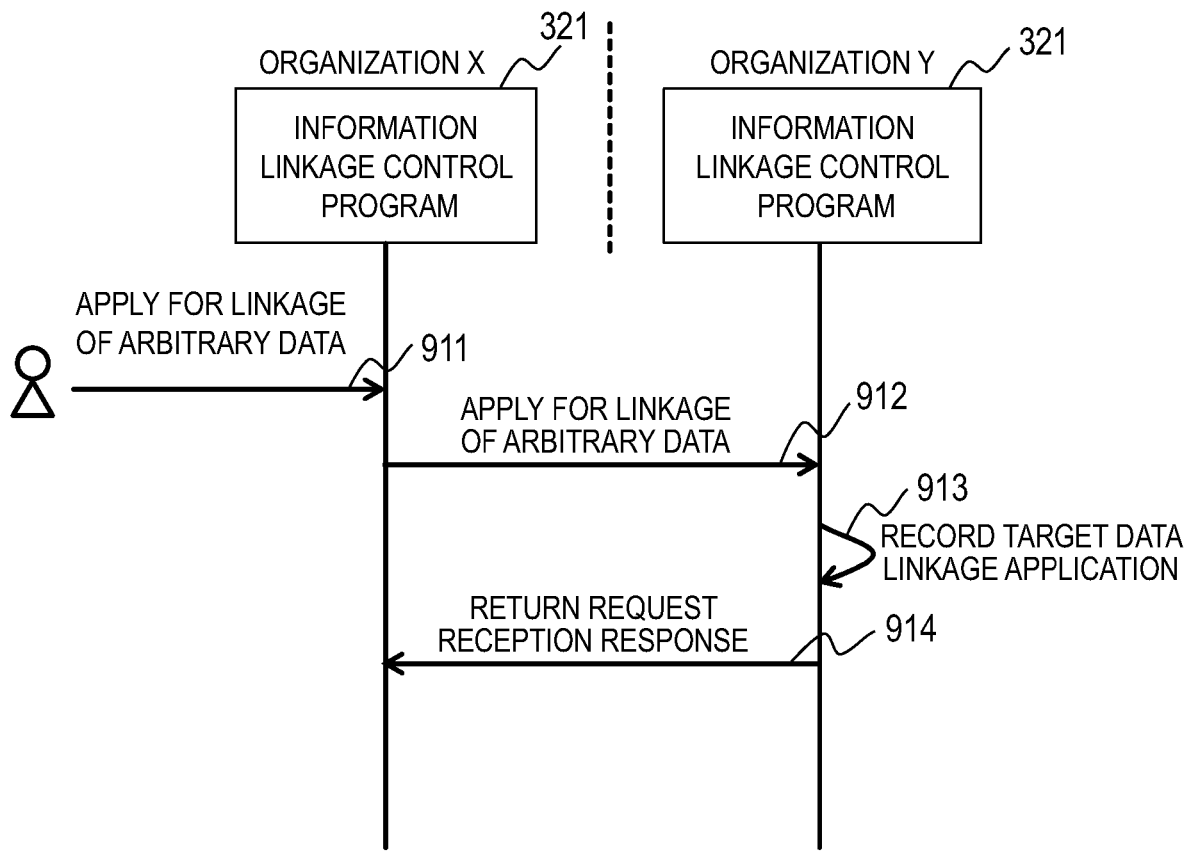
FIG. 9 is a sequence diagram for illustrating processing of a linkage application of arbitrary data among organizations in the embodiment.

FIG. 9 is a sequence diagram for illustrating processing of a linkage application of arbitrary data among organizations in the embodiment.

In this sequence, for example, it is assumed that there is a data catalog recording the data items and a description of the information stored by each organization, and the organization X has applied for linkage of arbitrary data of the organization Y based on the data catalog.

When a person from the organization X applies for linkage of arbitrary data to the information linkage control program 321 of the organization X via the input/output device 314 or the like (Step 911), the information linkage control program 321 of the organization X transmits via the external network 221 a linkage application for the arbitrary data to the information linkage control program 321 of the organization Y (Step 912). Then, the information linkage control program 321 of the organization Y records the data linkage application from the organization X (Step 913), and returns a reception response to the information linkage control program 321 of the organization X (Step 914).

Figure 10:
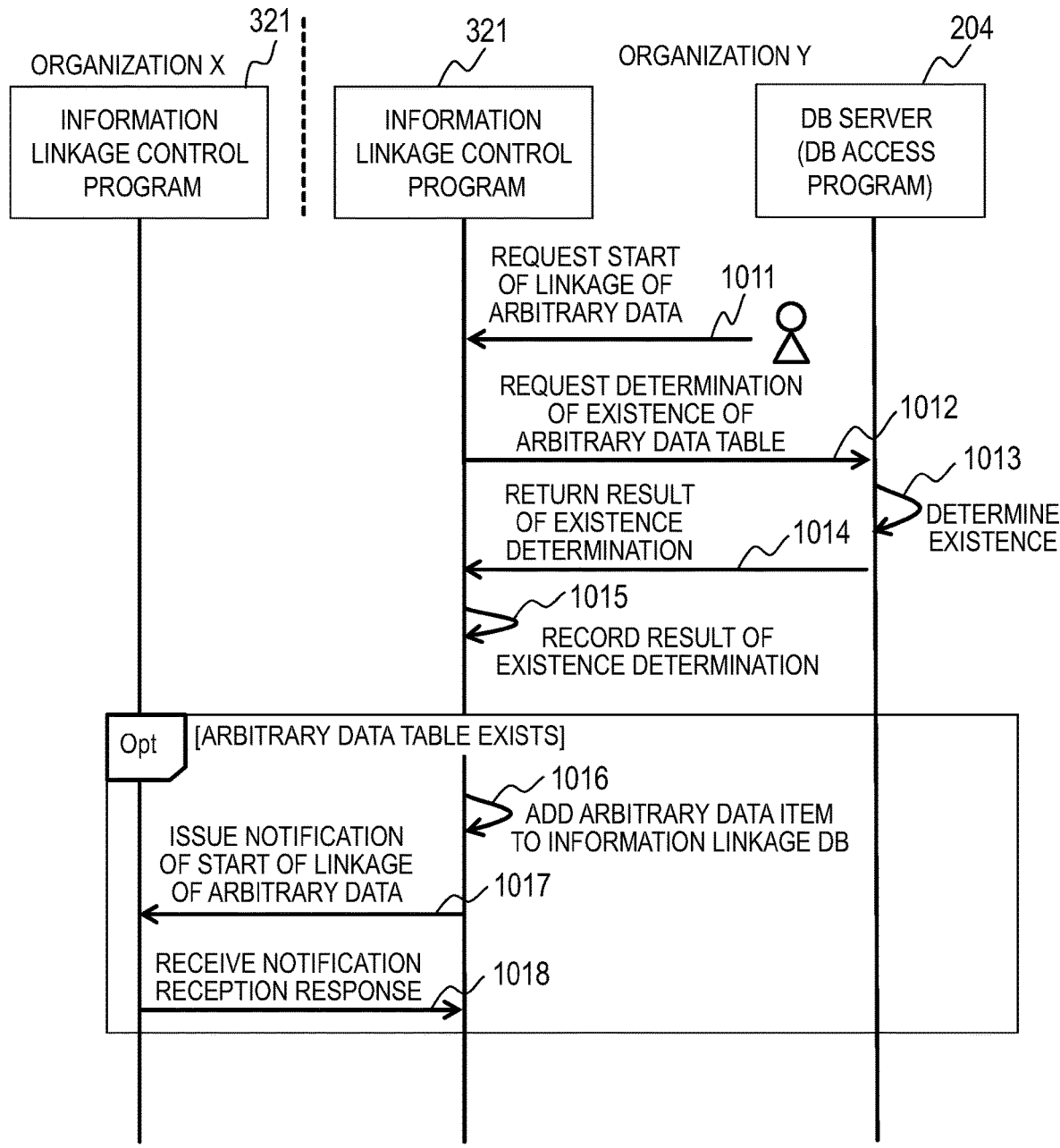
FIG. 10 is a sequence diagram for illustrating processing of starting linking of arbitrary data among organizations in the embodiment.

FIG. 10 is a sequence diagram for illustrating processing of starting linking of arbitrary data among organizations in the embodiment.

In FIG. 10, there is assumed a phase in which the organization Y starts the linking of data stored in the DB after a linkage application for the arbitrary data from the organization X to the organization Y has been recorded in the processing illustrated in FIG. 9. In the case of linking data for which there has not been a data linkage application from another organization, Steps 1017 and 1018 do not occur.

When a person from the organization Y requests the start of linkage of arbitrary data to the information linkage control program 321 of the organization Y via the input/output device 314 or the like (Step 1011), the information linkage control program 321 of the organization Y requests the DB access program of the server 204 of the organization Y to determine whether or not there exists a data table storing the arbitrary data in the DB (Step 1012).

Next, the DB access program of the DB server 204 of the organization Y determines whether the data table exists (Step 1013), and returns the data table existence determination result to the information linkage control program 321 of the organization Y (Step 1014). Then, the information linkage control program 321 of the organization Y records the existence determination result (Step 1015).

When there is a table of the arbitrary data (in the case in which a linkage application has been submitted, a table including the data for which the linkage application is submitted), the information linkage control program 321 of the organization Y adds an arbitrary data item (in the case in which a linkage application has been submitted, the data item for which the linkage application is submitted) to the information linkage DB 324 (Step 1016), notifies the information linkage control program 321 of the organization X of the start of linking the arbitrary data (Step 1017), and receives a notification reception response from the information linkage control program 321 of the organization X (Step 1018).

Figure 11:
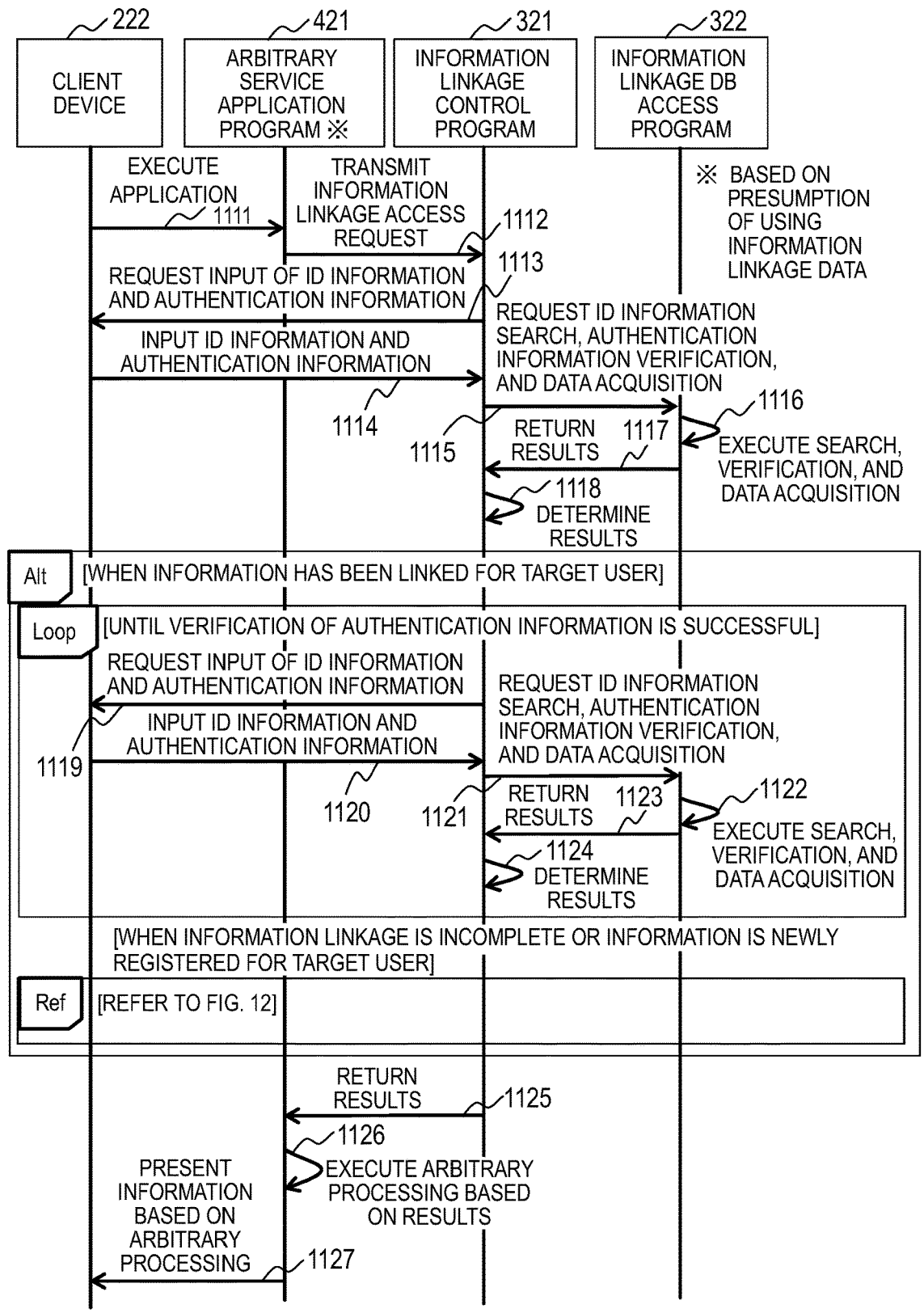
FIG. 11 is a sequence diagram for illustrating information linkage processing at the time when an inter-organizational information linkage application is executed in the embodiment.

FIG. 11 is a sequence diagram for illustrating processing of information linkage at the time when an inter-organizational information linkage application is executed in the embodiment.

The starting point of the processing is when the user executes, via the client device 222, the arbitrary service application program 421 of an arbitrary organization using the information linkage data (Step 1111). For example, this corresponds to a case in which the user uses an application provided by the organization X, and the application uses data added by an organization other than the organization X (e.g., organization Y). In that case, the arbitrary service application program 421, the information linkage control program 321, and the information linkage DB access program 322 shown in FIG. 11 are all programs of the organization X.

Then, the arbitrary service application program 421 transmits an information linkage access request to the information linkage control program 321 (Step 1112). In response to Step 1112, the information linkage control program 321 requests input of ID information and authentication information (Step 1113), and receives input of the ID information and the authentication information from the user via the client device 222 (Step 1114).

Next, the information linkage control program 321 requests the information linkage DB access program 322 to perform an ID information search, authentication information verification, and data acquisition (Step 1115). In response to the request, the information linkage DB access program 322 executes the ID information search, authentication information verification, and data acquisition (Step 1116), and returns the results to the information linkage control program 321 (Step 1117).

At this time, the information linkage control program 321 determines, based on the returned results, whether or not the user is registered, and whether or not the information has been linked, for example (Step 1118). Specifically, when the ID information on the user is not found in the information linkage DB 324, it can be determined that the ID information on the user is unregistered or input incorrectly. When the ID information on the user is found but the authentication information is not registered, it can be determined that the information linkage permission from the user has not yet been obtained. When the ID information and the authentication information are registered, but authentication verification fails, it can be determined that there is an error in the authentication information input.

In a case in which the information has been linked for the target user but verification of the authentication information failed after executing Step 1115 to Step 1118, the information linkage control program 321 again performs almost the same steps as Step 1113 to Step 1118. Specifically, the information linkage control program 321 requests the client device 222 again to input the ID information and the authentication information while suggesting an error in the authentication information (Step 1119), receives the input of the ID information and the authentication information (Step 1120), and requests the information linkage DB access program 322 to perform an ID information search, authentication information verification, and data acquisition (Step 1121).

In response to the request, the information linkage DB access program 322 executes the ID information search, authentication information verification, and data acquisition (Step 1122), and returns the results to the information linkage control program 321 (Step 1123). At this time, the information linkage control program 321 determines, based on the returned results, whether or not the user is registered, and whether or not the information has been linked, for example, (Step 1124).

Moreover, when the information linkage control program 321 determines, after Steps 1115 to 1118, that information linkage is incomplete or that it is required to newly register information for the target user, it is required to obtain information linkage permission from the target user and execute information linkage processing. The processing sequence at this time is described with reference to FIG. 12.

After executing the steps described above, the information linkage control program 321 returns the result to the information linkage access (Step 1112) from the arbitrary service application program 421 (Step 1125). In this case, as the response, a result in which the data is acquired by accessing the information linkage DB normally is returned, or a result in which an exception, for example, failing to acquire the data, has occurred is returned. In response to Step 1125, the arbitrary service application program 421 executes arbitrary processing (Step 1126), and presents information based on the arbitrary processing to the client device 222 (Step 1127).

Figure 12:
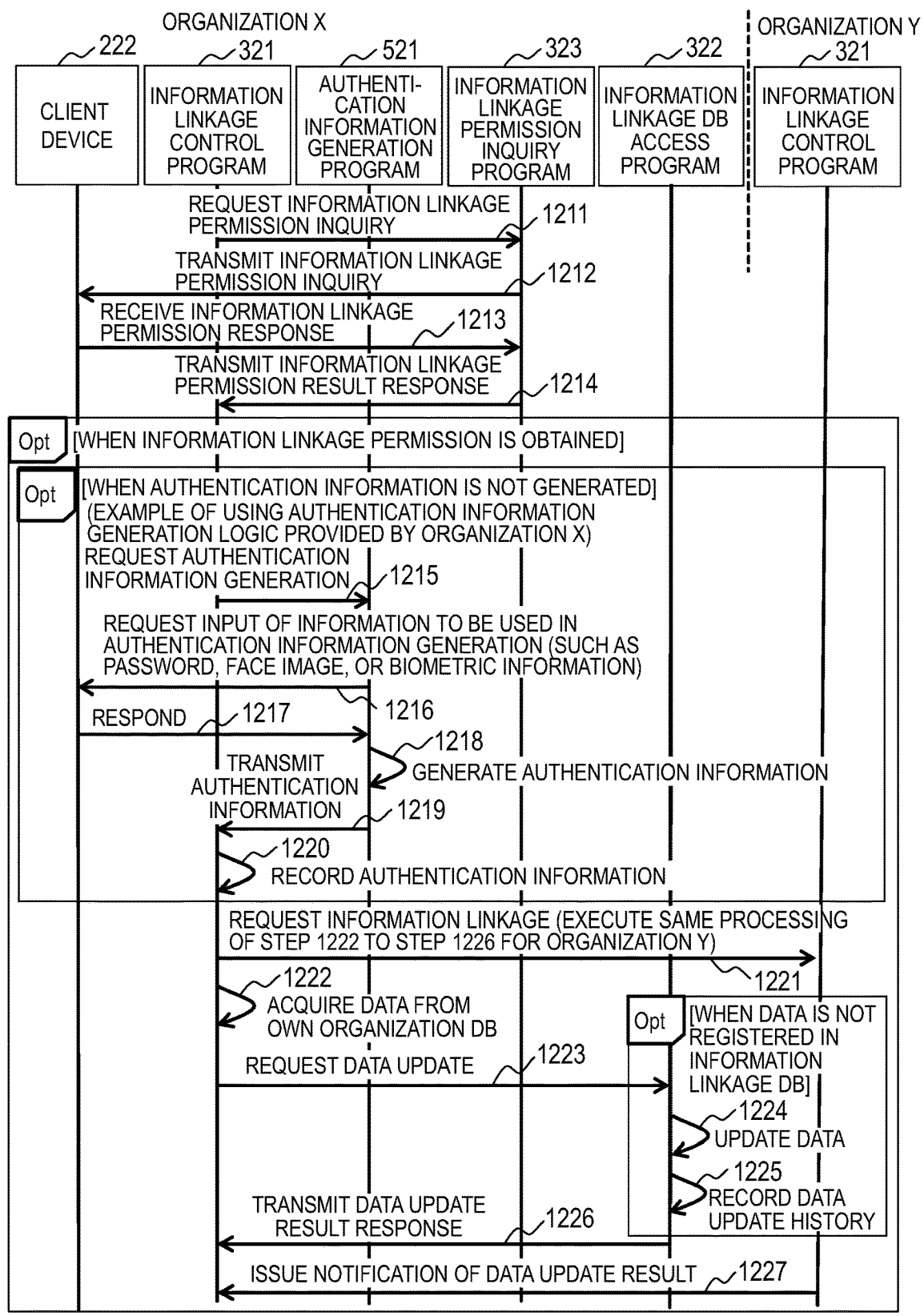
FIG. 12 is a sequence diagram for illustrating information linkage processing at the time when the inter-organizational information linkage application is executed in the embodiment.

FIG. 12 is a sequence diagram for illustrating information linkage processing at the time when the inter-organizational information linkage application is executed in the embodiment. Specifically, in FIG. 12, there is illustrated an information linkage sequence at the time when information linkage is incomplete or during new registration in FIG. 11.

First, the information linkage control program 321 requests an information linkage permission inquiry from the information linkage permission inquiry program 323 (Step 1211). In response to this, the information linkage permission inquiry program 323 transmits an information linkage permission inquiry to the client device 222 of the user (Step 1212), receives an information linkage permission response from the client device 222 (Step 1213), and then transmits the response result to the information linkage control program 321 (Step 1214). When information linkage permission is not obtained from the user, the processing does not advance to the subsequent steps of implementing information linkage.

When information linkage permission from the user is obtained by performing Step 1211 to Step 1214, the processing advances to information linkage processing. In this case, when authentication information has not yet been generated, the information linkage control program 321 requests the authentication information generation program 521 to generate authentication information (Step 1215). In response to Step 1215, the authentication information generation program 521 requests the client device 222 of the user for input of the information to be used for generating authentication information (e.g., password, face image, and biometric information) (Step 1216). After receiving the response (Step 1217), the authentication information generation program 521 generates authentication information (Step 1218) and transmits the generated authentication information to the information linkage control program 321 (Step 1219). The information linkage control program 321 records the authentication information in a DB or the like (Step 1220).

In Step 1221 to Step 1227, information linkage processing steps are illustrated. First, the information linkage control program 321 of the organization X transmits an information linkage request to the information linkage control program 321 of another organization (Step 1221). In FIG. 12, there is illustrated an example in which an information linkage request is transmitted to the information linkage control program 321 of the organization Y, but when information linkage is to be performed with another organization (e.g., organization Z) as well, an information linkage request is also transmitted to that organization. Although omitted in FIG. 12, the following Step 1222 to Step 1226 are executed in all organizations that have received an information linkage request.

After Step 1221, the information linkage control program 321 acquires the data to be linked from a DB held by the own organization (e.g., DB shown in FIG. 6A) (Step 1222), and transmits a data update request to the information linkage DB access program 322 (Step 1223).

When the data of the data item received from the information linkage control program 321 exists in the information linkage DB, the information linkage DB access program 322 updates the data (Step 1224), and records a data update history (Step 1225). When the data of the data item received from the information linkage control program 321 already exists in the information linkage DB, the information linkage DB access program 322 does not execute Step 1224 and Step 1225.

Then, the information linkage DB access program 322 transmits a data update result response to the information linkage control program 321 (Step 1226). In response to the information linkage request of Step 1221, the information linkage DB access program 322 receives a data update result notification from all the organizations that have executed Step 1222 to Step 1226 (Step 1227).

There is now described as an example the processing of FIG. 12 to be executed when the user U shown in FIG. 6A to FIG. 6C and FIG. 7 tries to use a service of the organization X. In this case, the information linkage control program 321 of the organization X acquires the contents of the data table 601 of the organization X (FIG. 6A) relating to the user U (Step 1222). The information linkage DB access program 322 of the organization X updates the information linkage DB 324 of the organization X such that the content acquired in Step 1222 is reflected (Step 1224).

Similarly, the information linkage server 201 of the organization Y that has received the information linkage request (Step 1221) executes the same processing as in Step 1222 to Step 1225. In other words, the information linkage control program 321 of the organization Y acquires the contents of the data table 602 of the organization Y (FIG. 6B) relating to the user U. The information linkage DB access program 322 of the organization Y updates the information linkage DB 324 of the organization Y such that the acquired content is reflected.

When the organization X is to also perform information linkage with another organization (e.g., organization Z), the same processing as described above is executed between the organization X and the another organization.

Then, the update of the information linkage DB 324 performed for each organization is reflected. For example, the information linkage server 201 of the organization X may acquire the information on the user U added by the update of the information linkage DB 324 of the organization Y, and add the acquired information to the information linkage DB 324 of the organization X. As a result, in the information linkage DB 324 of each organization, as shown in FIG. 7, for example, the information on the user U added by the organization X and the information on the user U added by the organization Y are stored in association with each other.

Figure 13:
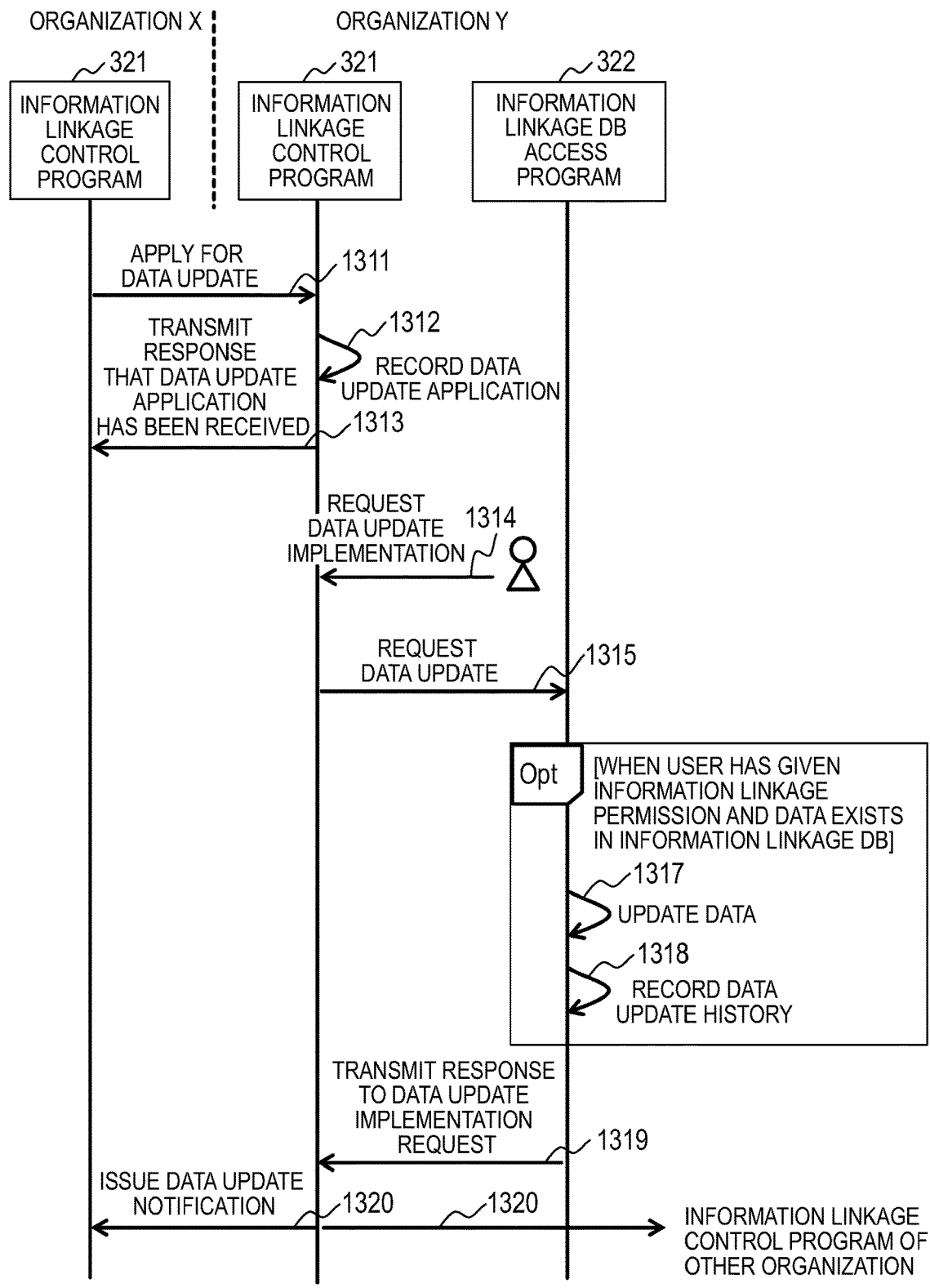
FIG. 13 is a sequence diagram for illustrating data update processing after information linkage in the embodiment.

FIG. 13 is a sequence diagram for illustrating data update processing after information linkage in the embodiment.

In FIG. 13, as an example, there is assumed a case in which an update application is submitted from the organization X to the organization Y for the data item data linked by the organization Y. This processing is performed when the organization X tries to update the data of a data item for which the organization Y has update authority. For example, such processing can be performed when a user desires to update, while accessing the organization X, data relating to himself or herself added by the organization Y.

It should be noted that, for example, when the organization Y itself tries to update the data of a data item for which the organization Y has update authority, a data update application is performed from the organization Y. In this case as well, except for the fact that Step 1311 and Step 1313 are completed within the own organization Y, the same steps as those described below are executed.

First, the information linkage control program 321 of the organization X transmits a data update request to the information linkage control program 321 of the organization Y (Step 1311). In response to this, the information linkage control program 321 of organization Y records the data update application (Step 1312) and transmits a response that the data update application has been received (Step 1313).

Then, when a person from organization Y transmits a data update implementation request to the information linkage control program 321 of the organization Y via the input/output device or the like (Step 1314), the information linkage control program 321 of the organization Y transmits, for the data update applications received so far, a data update request to the information linkage DB access program 322 of the organization Y (Step 1315). The data update request of Step 1314 may specify all of the data update applications at once, or may select and specify a part of the data update applications.

After Step 1315, when the user has given permission to link the data and the data exists in the information linkage DB, the information linkage DB access program 322 of the organization Y updates the data and records a data update history (Step 1317 and Step 1318). Then, the information linkage DB access program 322 of the organization Y transmits a response to the data update execution request to the information linkage control program 321 of the organization Y (Step 1319). Lastly, the information linkage control program 321 of the organization Y issues a data update notification to the information linkage control programs 321 of all the organizations that can refer to the target data, including the information linkage control program 321 of the organization X that submitted the data update application (Step 1320). The information linkage control program 321 and the information linkage DB access program 322 of each organization (e.g., organization X) that have received this notification also apply the notified update of the data to their information linkage DB 324.

As described above, in one mode of this invention, an inter-organizational information linkage system is configured to execute: information linkage control processing of receiving and processing a request for information linkage among organizations; access processing to an information linkage DB; and information linkage permission inquiry processing of performing an information linkage permission application to a user. The inter-organizational information linkage system includes a memory and a processor coupled to the memory.

The processor is configured to: issue an information linkage permission inquiry to the user for personal information to be linked among organizations recorded in advance; transmit and receive, after the information linkage permission is obtained, a personal information linkage request to the organization linking the information together with externally-generated user authentication information; and update a personal information record in an information linkage database (hereinafter referred to as "DB") in response to the personal information linkage request. Then, the processor refers to and updates the personal information record in the information linkage DB in accordance with a user or organization request.

In the mode described above, it is possible to authenticate and link personal information independently held among a plurality of organizations while obtaining information linkage permission from the user, to thereby promote information linkage in both directions. As a result, each organization can obtain opportunities for creating a new business based on information that is not obtainable only by itself. The user can use a service provided by a new business created as a result of the inter-organizational information linkage platform.

A representative example of the above-mentioned modes of this invention is summarized as follows. Specifically, an information linkage system includes a processor (e.g., processor 313) and a storage device (e.g., storage device 311) coupled to the processor. The storage device may be configured to hold identification information of a user (e.g., X-ID of FIG. 6A and FIG. 7) and information (e.g., X-DATA of FIG. 6A and FIG. 7) on the user, which are added by a first organization (e.g., organization X), in association with each other. The processor may be configured to: transmit to a second organization (e.g., organization Y) an information linkage application regarding information on any one item included in the information on the user (e.g., Step 912 of FIG. 9); acquire, when the information linkage application is received, identification information of the user and information on the user of the item specified by the information linkage application, which are added by the second organization; and store the acquired information in the storage device in association with the identification information of the user and the information on the user regarding the same user as a user identified by the acquired identification information, which are added by the first organization (e.g., as information linkage DB table 701 shown in FIG. 7).

As a result, the linkage of information can be implemented among organizations linking and handling personal information across a plurality of organizations.

In this configuration, the processor may be configured to: transmit a request to the user for permission of information linkage regarding the information added by the second organization (e.g., Step 1212 of FIG. 12); and acquire, when permission is obtained in response to the request, the identification information of the user and the information on the user of the item specified by the information linkage application, which are added by the second organization.

As a result, linkage of information against the intention of the user is prevented, and thus information security is ensured.

Further, the processor may be configured to: output an input request for information to be used to generate authentication information of the user (e.g., Step 1216 of FIG. 12); generate the authentication information of the user by using the information input in accordance with the input request (e.g., Step 1218 of FIG. 12); and hold the generated authentication information in the storage device in association with (e.g., like X-KEY corresponding to X-ID shown in FIG. 6A or FIG. 7) the identification information of the user (e.g., Step 1220 of FIG. 12).

As a result, improper actions, for example, impersonating the user, are prevented, and thus information security is ensured.

Further, the processor may be configured to: output an input request to the user for authentication information (e.g., Step 1113 of FIG. 11); compare the authentication information input in accordance with the input request for the authentication information and authentication information stored in the storage device in association with the user (e.g., Step 1116 of FIG. 11); and execute, when authentication is successful as a result of the comparison of the authentication information, processing that uses from the storage device the information added by the second organization (e.g., Step 1126 of FIG. 11).

As a result, improper actions, for example, impersonating the user, are prevented, and thus information security is ensured.

The storage device may be configured to hold information (e.g., combination list 702 of FIG. 7) specifying a combination of identification information and authentication information that are valid for authentication of the user among the identification information of the user added by the first organization, the authentication information of the user generated by the first organization, the identification information of the user added by the second organization, and the authentication information of the user generated by the second organization, and the processor may be configured to compare, when identification information of the user and authentication information of the user are input, based on the information specifying the combination of the identification information and the authentication information that are valid for authentication of the user, authentication information corresponding to the input identification information of the user and the input authentication information of the user (e.g., Step 1116 of FIG. 11).

As a result, it is possible to use authentication information that is easy for the user to use while ensuring information security, to thereby improve user convenience.

Further, the storage device may be configured to hold access authority information (e.g., FIG. 8A and FIG. 8B) indicating presence or absence of reference authority for the information added by each organization and presence or absence of update authority for the information, and the processor may be configured to update and refer to the information added by each organization in accordance with the access authority information.

As a result, information security and overall consistency of information are ensured.

Further, the processor may be configured to: transmit an update application for information on an item for which the first organization has no update authority to an organization having update authority for the information on the item (e.g., Step 1311 of FIG. 13); reflect, when an update notification is received from the organization having update authority for the information on the item, content of the update notification in the information stored in the storage device (e.g., Step 1320 of FIG. 13); update, when an update application for information on an item for which the first organization has update authority is received, the information stored in the storage device based on the update application (e.g., Step 1317 of FIG. 13); and transmit an update notification for notifying the update of the information (e.g., Step 1320 of FIG. 13).

As a result, user convenience is improved while information security is ensured.

Although the present disclosure has been described with reference to example embodiments, those skilled in the art will recognize that various changes and modifications may be made in form and detail without departing from the spirit and scope of the claimed subject matter.

For example, the above-mentioned embodiment has been described in detail for better understanding of this invention, but this invention is not necessarily limited to an invention having all the configurations described above. A part of the configuration of a given embodiment may be replaced with a configuration of another embodiment, or the configuration of another embodiment can be added to the configuration of a given embodiment. It is also possible to add, delete, and replace other configurations for a part of the configuration of each embodiment.

A part or all of each of the above-mentioned configurations, functions, processing modules, processing means, and the like may be implemented by hardware by being designed as, for example, an integrated circuit. Each of the above-mentioned configurations, functions, and the like may be implemented by software by a processor interpreting and executing a program for implementing each function. Information on the programs, tables, files, and the like for implementing each of the functions may be stored in a storage device such as a non-volatile semiconductor memory, a hard disk drive, or a solid state drive (SSD), or in a computer-readable non-transitory data storage medium such as an IC card, an SD card, or a DVD.

The control lines and information lines are illustrated to the extent considered to be required for description, and not all the control lines and information lines on the product are necessarily illustrated. In practice, it may be considered that almost all configurations are coupled to each other.

What is claimed is:

1. An inter-organizational information linkage platform system for linking information between a plurality of organization systems, the inter-organizational information linkage platform system comprising:

a first organization system; and one or more second organization systems;

wherein each organization system of the plurality of organization systems comprises an organization database server, an application server and an information linkage system;

wherein each information linkage system comprises a processor, and an information linkage storage device coupled to the processor;

wherein, for each user of a plurality of users, the organization database server stores identification information of the user and information regarding the user;

wherein, in each organization system, the application server executes arbitrary processing by using linked data stored by the information linkage storage device and by executing an arbitrary service application program;

wherein a first information linkage system of the first organization system has a first processor and is configured to link information between the first information linkage system and a second information linkage system of a second organization system, said information being information linkage target data, and wherein the first information linkage system is further configured to store identification information of a first user that is derived from the first organization system and information regarding the first user that is derived from the first organization system, wherein the first processor is configured to:

add the identification information of the first user derived from the first organization system and the information regarding the first user derived from the first organization system by referring to a first data table in the first organization database server of the first information linkage system, wherein the identification information of the first user and the information regarding the first user are stored in association with each other in the first data table;

transmit to the second information linkage system an information linkage application for information regarding any one item included in the information regarding the user;

acquire, when the information linkage application is received by the second information linkage system, identification information of the first user that is derived from the second information linkage system, and information regarding the first user that is derived from the second information linkage system, of the item specified by the information linkage application, wherein a second processor of the second information linkage system organization is configured to add the identification information of the first user derived from second information linkage system and the information regarding the first user derived from second information linkage system by referring to a second data table in the second organization database server of the second organization system;

register the information regarding the first user derived from the second organization, which is acquired from the second information linkage system, in the information linkage storage device in association with the identification information of the first user and the information regarding the first user, which are added by the first information linkage system;

output an input request for information to be used to generate authentication information of the first user;

generate authentication information of the first user by using information input in accordance with the input request;

store the generated authentication information in the information linkage storage device in association with the identification information of the first user;

output an input request to the first user for authentication information;

compare the authentication information input in accordance with the input request for the authentication information and the authentication information stored in the information linkage storage device in association with the first user;

update and refer to the information added by the plurality of the information linkage systems in accordance with access authority information; and transmit an update application for information regarding an item, for which the first organization system has no update authority, to one or more organizations in the plurality of organizations having update authority for the information regarding the data item;

wherein a first application server included in the first organization system is configured to execute, when authentication is successful as a result of the comparison of the authentication information, processing that uses the information regarding the first user derived from the first organization system, which is stored in the information linkage storage device, and the information regarding the first user derived from the second organization, which is acquired from the second organization;

wherein the information linkage storage device is configured to store the access authority information indicating a presence or absence of a reference authority for the information added by the plurality of the information linkage systems, and a presence or absence of update authority for the information added by the plurality of the information linkage systems.

2. The inter-organizational information linkage platform system according to claim 1, wherein, the first processor is further configured to:

reflect, when an update notification is received from an organization having update authority for the information regarding the item, content of the update notification in the information stored in the information linkage storage device;

update, when an update application for information regarding an item for which the first organization system has update authority is received, the information stored in the information linkage storage device based on the update application; and transmit an update notification about the update.

3. The inter-organizational information linkage platform system according to claim 1, wherein the information regarding the user comprises a plurality of data items about the user; and the first processor is further configured to transmit separate requests to the user for each data item of the plurality of data items comprising the personal information to the user for permission of information linkage of each data item.

4. The inter-organizational information linkage platform system according to claim 1, wherein the personal information about the user comprises a plurality of data items about the user; and the first processor is further configured to transmit separate requests to the user for each data item of the plurality of data items comprising the personal information to the user for permission of information linkage of each data item.

5. An inter-organizational information linkage platform method for linking information between a plurality of organization systems including a first organization system and one or more second organization systems, wherein each organization system of the plurality of organization systems comprises an organization database server, an application server and an information linkage system, wherein each information linkage system comprises a processor and an information linkage storage device coupled to the processor, wherein, for each user of a plurality of users, the organization database server stores identification information of the user and information regarding the user, wherein, in each organization system, the application server executes arbitrary processing by using linked data stored by the information linkage storage device and by executing an arbitrary service application program, wherein a first information linkage system of the first organization system has a first processor and is configured to link information between the first information linkage system and a second information linkage system of a second organization system, said information being information linkage target data, and wherein the first information linkage system is further configured to store identification information of a first user that is derived from the first organization system and information regarding the first user that is derived from the first organization system, the information linkage platform method comprising:

adding, by the first processor, the identification information of the first user derived from the first organization system and the information regarding the first user derived from the first organization system by referring to a first data table in the first organization database server of the first information linkage system, wherein the identification information of the first user and the information regarding the first user are stored in association with each other in the first data table;

transmitting, by the first processor, to the second information linkage system, an information linkage application for information regarding any one item included in the information regarding the user;

acquiring, by the first processor, when the information linkage application is received by the second information linkage system, identification information of the first user that is derived from the second information linkage system, and information regarding the first user that is derived from the second information linkage system, of the item specified by the information linkage application, wherein a second processor of the second information linkage system organization is configured to add the identification information of the first user derived from second information linkage system and the information regarding the first user derived from second information linkage system by referring to a second data table in the second organization database server of the second organization system;

registering, by the first processor, the information regarding the first user derived from the second organization, which is acquired from the second information linkage system, in the information linkage storage device in association with the identification information of the first user and the information regarding the first user, which are added by the first information linkage system;

outputting, by the first processor, an input request for information to be used to generate authentication information of the first user;

generating, by the first processor, authentication information of the first user by using information input in accordance with the input request;

storing, by the first processor, the generated authentication information in the information linkage storage device in association with the identification information of the first user;

outputting, by the first processor, an input request to the first user for authentication information;

comparing, by the first processor, the authentication information input in accordance with the input request for the authentication information and the authentication information stored in the information linkage storage device in association with to the first user, updating and referring, by the first processor, to the information added by the plurality of the information linkage systems in accordance with access authority information; and transmitting, by the first processor, an update application for information regarding an item, for which the first organization system has no update authority, to one or more organizations in the plurality of organizations having update authority for the information regarding the data item;

wherein a first application server included in the first organization system is configured to execute, when authentication is successful as a result of the comparison of the authentication information, processing that uses the information regarding the first user derived from the first organization system, which is stored in the first information linkage storage device, and the information regarding the first user derived from the second organization, which is acquired from the second organization, wherein the information linkage storage device is configured to store the access authority information indicating a presence or absence of a reference authority for the information added by the plurality of the information linkage systems, and a presence or absence of update authority for the information added by the plurality of the information linkage systems.

6. The inter-organizational information linkage platform method according to claim 5, wherein the information linkage platform method further comprising:

reflecting, by the first processor, when an update notification is received from an organization having update authority for the information regarding the item, content of the update notification in the information stored in the information linkage storage device;

updating, by the first processor, when an update application for information regarding the item for which the first organization system has update authority is received, the information stored in the information linkage storage device based on the update application; and transmitting, by the first processor, an update notification about the update of the information.

7. The inter-organizational information linkage platform method according to claim 5, wherein the personal information about the user comprises a plurality of data items about the user; and the first processor is further is configured to transmit separate requests to the user for each data item of the plurality of data items comprising the personal information to the user for permission of information linkage of each data item.

8. The inter-organizational information linkage platform method according to claim 5, wherein the personal information about the user comprises a plurality of data items about the user; and the first processor is further is configured to transmit separate requests to the user for each data item of the plurality of data items comprising the personal information to the user for permission of information linkage of each data item.

* * * * *